United States Patent [19]

Takahashi et al.

[11] Patent Number: 5,095,774
[45] Date of Patent: Mar. 17, 1992

[54] METHOD FOR CONTROLLING GEAR TRANSMISSION FOR VEHICLE

[75] Inventors: Tsutomu Takahashi; Hiromi Kohno; Masuhiro Otsuka, all of Higashimatsuyama, Japan

[73] Assignee: Zexel Corporation, Japan

[21] Appl. No.: 712,747

[22] Filed: Jun. 10, 1991

[30] Foreign Application Priority Data

Jun. 14, 1990 [JP] Japan .................. 2-156198

[51] Int. Cl.⁵ .......................................... F16H 61/02
[52] U.S. Cl. ................................... 74/866; 364/424.1
[58] Field of Search ....................... 74/866; 364/424.1

[56] References Cited

U.S. PATENT DOCUMENTS

| | | | |
|---|---|---|---|
| 4,627,312 | 12/1986 | Fujieda et al. | 364/424.1 X |
| 4,643,048 | 2/1987 | Hattori et al. | 74/866 |
| 4,848,529 | 7/1989 | Kurihara et al. | 74/866 X |
| 4,977,992 | 12/1990 | Ohtsuka et al. | 364/424.1 X |
| 5,024,305 | 6/1991 | Kunhara et al. | 74/866 X |

FOREIGN PATENT DOCUMENTS 60-11753 1/1985 Japan .
63-258234 10/1988 Japan .
63-266262 11/1988 Japan .

*Primary Examiner*—Dirk Wright
*Attorney, Agent, or Firm*—Pollock, Vande Sande & Priddy

[57] ABSTRACT

In a method for controlling the gear-shift operation of a gear transmission for a vehicle in accordance with the running speed of the vehicle, in response to a command for shifting the transmission from its neutral position, the transmission is first shifted into a prescribed high gear position to detect the actual vehicle running speed and a target gear position is determined on the basis of the resulting detected vehicle running speed, whereafter the transmission is shifted into the target position.

6 Claims, 3 Drawing Sheets

METHOD FOR CONTROLLING GEAR TRANSMISSION FOR VEHICLE

BACKGROUND OF THE INVENTION

1. Field of the Invention

The present invention relates to a method for controlling the gear-transmission of a vehicle, and more particularly to a controlling method for vehicular gear transmissions which is suitable for shifting the vehicular gear transmission to the appropriate gear position in the case where ordinary detection of vehicle running speed becomes impossible.

2. Description of the Prior Art

In the prior art there have been proposed various vehicle transmission control systems for shifting a vehicular gear transmission to the gear position suitable for the vehicle running speed at that time. In the conventional control system of such type, various back-up control systems have been proposed for securing transmission control operation even if it becomes impossible to determine the vehicle running speed by the vehicle speed sensor. For example, Japanese Patent Application Public Disclosure No. 11753/85 discloses a transmission control system having a back-up system by which the gear-shifting operation of the vehicular transmission is carried out in accordance with vehicle speed data calculated from the current gear position and the engine rotational speed, which is equal to the rotational speed on the input side of the transmission in the case where the gear-transmission is shifted to a position other than its neutral position. Furthermore, this disclosed system is arranged to store the vehicle speed data calculated just before the gear transmission is shifted to its neutral position, and the stored vehicle speed data is used for controlling the gear-shifting operation of the gear-transmission when the gear transmission is shifted out of its neutral position.

However, according to the disclosed control system, when the gear transmission is shifted into the neutral gear position when the vehicle is running down hill, the actual vehicle speed becomes higher than the vehicle speed data stored just after the gear transmission was shifted into the neutral position. As a result, the gear-transmission may be shifted into a position different from the position suitable for the actual vehicle speed just before the selecting lever is moved from the neutral position to the drive position, whereby the gear transmission is sometimes damaged. A similar disadvantage arises in the case where the driver moves the selecting lever from the neutral position to the reverse position at the time when the actual vehicle speed has become greater than zero because of down-hill running of the vehicle, even though the calculated vehicle speed obtained just before the gear-transmission was shifted to the neutral position is zero.

SUMMARY OF THE INVENTION

It is an object of the present invention to provide an improved method for controlling vehicle gear transmissions which is capable of overcoming the foregoing drawbacks.

It is another object of the present invention to provide a method for controlling vehicle gear transmissions, which is capable of conducting the appropriate gear-shifting operation without the use of the vehicle speed data produced by a speed sensor.

According to the present invention, in a method for controlling the gear-shift operation of a vehicle gear transmission installed between a wheel driving unit and an internal combustion engine in accordance with the vehicle running speed, in response to a command for shifting the gear transmission from the neutral position to a gear position other than the neutral position, the gear transmission is first shifted into a prescribed high gear position wherein the actual vehicle running speed is detected and the target gear position is determined on the basis of the resulting detected vehicle running speed, whereafter the gear transmission is shifted into the target gear position. The actual vehicle running speed can be calculated on the basis of the rotational speed on the input side of the gear transmission.

In the preferred embodiment, in the case where a command for shifting the gear transmission is produced when the gear transmission is in the neutral position, the vehicle running speed is detected by shifting the gear transmission to its highest gear position. However, the gear position to be shifted to is not limited to the highest position but can be any high gear position appropriate for detecting the vehicle running speed. The control method of the present invention is suitable for use as a back-up control in the case where the vehicle speed sensor has malfunctioned and is unable to produce vehicle running speed information. However, the control method of the present invention can, of course, also be used in the case where the transmission control system is functioning normally, irrespective of the condition of the vehicle speed sensor.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
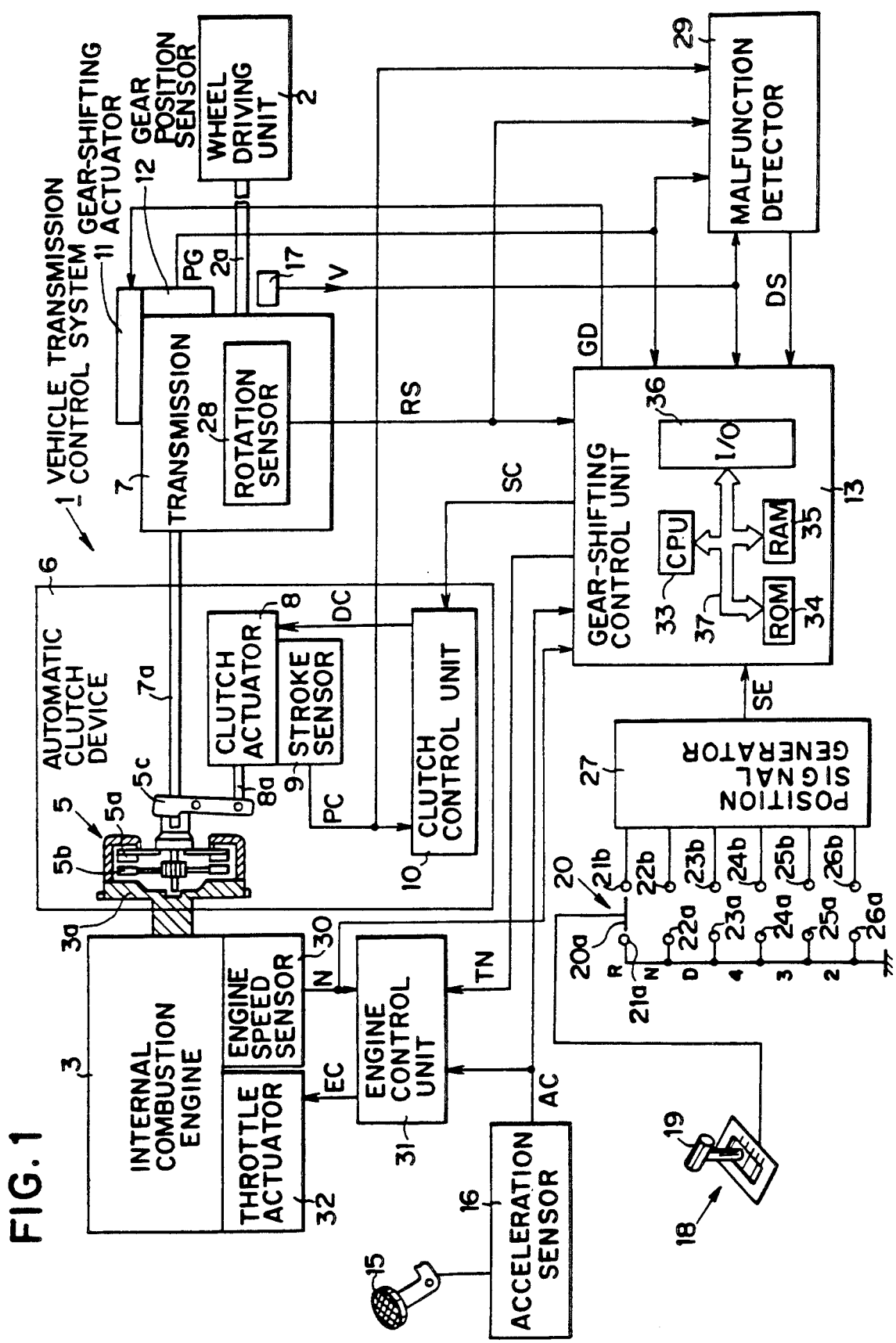
FIG. 1 is a schematic view illustrating an embodiment of a vehicle transmission control system which is controlled in accordance with the present invention.

The vehicle transmission control system 1 shown in FIG. 1 is for a vehicle (not shown) powered by an internal combustion engine 3 whose rotational output is transmitted through an automatic clutch device 6, including a friction clutch 5, and a gear transmission 7 to a wheel driving unit 2.

The friction clutch 5 is mounted on an engine flywheel 3a and is a well-known dry-type single-disk clutch having a pressure plate 5a, a clutch disk 5b and a clutch release lever 5c. In order to control the engaging/disengaging (on/off) operation of the clutch 5, there is provided a clutch actuator 8 having a piston rod 8a connected to the clutch release lever 5c for actuating the clutch release lever 5c. The clutch actuator 8 is coupled with a stroke sensor 9 for detecting the position of the pressure plate 5a of the clutch 5 and a clutch position signal PC indicating the position of the pressure plate 5a is produced by the stroke sensor 9. The clutch position signal PC is applied to a clutch control unit 10, to which a clutch control signal SC showing the target position of the pressure plate 5a is supplied from a gear-shifting control unit 13.

The clutch control unit 10 is responsive to the clutch position signal PC and the clutch control signal SC and produces a first driving signal DC for driving the clutch actuator 8 in such a way that the actual position of the pressure plate 5a becomes that indicated by the clutch control signal SC. As a result, the amount of operation of the clutch 5 is controlled by the clutch control unit 10 so as to position the pressure plate 5a at the position indicated by the clutch control signal SC.

The clutch 5 is connected by an input shaft 7a with the transmission 7, and the rotational output of the transmission 7 is transmitted through a propeller shaft 2a to the wheel driving unit 2 of the vehicle.

The transmission 7 is actuated by a gear-shifting actuator 11 associated therewith, and the gear position set in the transmission 7 is detected by a gear position sensor 12 associated with the transmission 7 to produce a gear position signal PG showing the actual or current gear position set in the gear transmission 7.

For automatically shifting the gear transmission 7 into the gear position suitable for the operation condition of the vehicle at that time, there is provided the gear-shifting control unit 13, in which the most suitable gear position for the operation condition of the vehicle at that time is determined by a map calculation, and a second driving signal GD, which is for driving the gear shifting-actuator 11 so as to shift the gear transmission 7 to the calculated most suitable gear position, is produced.

The gear-shifting control unit 13 receives an acceleration signal AC showing the amount of operation of an acceleration pedal 15, the gear position signal PG, a vehicle speed signal V showing the running speed of the vehicle, and a selected position signal SE showing the selected position of a selecting lever 19 of a selector 18. The acceleration signal AC is produced by an acceleration sensor 16 associated with the acceleration pedal 15 and the vehicle speed signal V is produced by a vehicle speed sensor 17 of well-known design, which is mounted on the propeller shaft 2a.

Reference numeral 28 designates a rotation sensor incorporated into the the gear transmission 7 for detecting the rotational speed of the counter shaft (not shown) of the gear transmission 7. A rotation signal RS representing the rotational speed of the counter shaft is generated by the rotation sensor 28 and supplied to the gear-shifting control unit 13.

The selecting lever 19 is manipulated by the driver to select one position from among a plurality of positions which include an "N" position (neutral), a "2" position, a "3" position, a "4" position, a "D" position (automatic gear changing position), and an "R" position (reverse). That is, the driver manipulates the selecting lever 19 in order to select the desired control mode of the vehicle transmission control system 1. The selecting lever 19 is coupled with a switch 20 having a movable contact 20a which moves in accordance with the position of the selecting lever 19. The switch 20 further comprises the following six sets of fixed contacts: 21a–21b, 22a–22b, 23a–23b, 24a–24b, 25a–25b, and 26a–26b, which correspond to the positions "R", "N", "D", "4", "3" and "2" of the selector 18, respectively. The movable contact 20a is linked with the selecting lever 19 so as to bridge (electrically connect) only the fixed contacts of the set of fixed contacts among the six sets which corresponds to the set position of the selecting lever 19. The fixed contacts 21a to 26a are grounded and the fixed contacts 21b to 26b are independently connected with a position signal generator 27.

The position signal generator 27 discriminates which fixed contact among the fixed contacts 21b to 26b is grounded, whereby it detects the position of the movable contact 20a. Then the selected position signal SE representing the position of the selecting lever 19 is generated by the position signal generator 27.

In addition, the gear transmission 7 has six forward gear positions, namely, first speed to sixth speed positions, the sixth speed position being the highest.

The vehicle transmission control system 1 has a malfunction detector 29 for detecting whether the vehicle speed sensor 17 has malfunctioned. The malfunction detector 29 receives the rotation signal RS, the vehicle speed signal V, the clutch position signal PC and the gear position signal PG, and determines that the vehicle speed sensor 17 has malfunctioned when the difference between the vehicle speed detected by the vehicle speed sensor 17 and the vehicle speed calculated from the rotation signal RS and the gear position signal PG is not within a predetermined range in the case where the clutch 5 is engaged and the transmission 7 is in a position other than neutral. The malfunction detector 29 produces a high-level detection signal DS when it detects that the vehicle speed sensor 17 has malfunctioned. The detection signal DS is supplied to the gear-shifting control unit 13.

When level of the detection signal DS becomes high due to malfunction of the vehicle speed sensor 17, the transmission 7 and the clutch 5 are controlled by the gear-shifting control unit 13 in a back-up control mode to shift the transmission 7 into the target position. The back-up control operation will be described later in detail.

The gear-shifting control unit 13 determines the most suitable gear position for the operation condition of the vehicle at that time, namely the target gear position, in response to, for example, the signals AC, PG, V and SE.

The gear-shifting control unit 13 discriminates whether or not the actual gear position shown by the gear position signal PG is coincident with the target gear position. In the case where the actual gear position is not coincident with the target gear position, the gear-shifting control unit 13 produces the clutch control signal SC, a target speed signal TN showing the target rotational speed of the internal combustion engine 3 and the second driving signal GD, which are necessary for carrying out the gear-shifting operation for shifting the transmission 7 into the target gear position.

The gear-shifting control unit 13 includes a central processing unit (CPU) 33, read-only memory (ROM) 34, random access memory (RAM) 35 and I/O interface 36, which are interconnected by a bus 37 to form a microcomputer. The gear-shifting control unit 13 receives the signals AC, SE, V, PG, RS, DS and an engine speed signal N generated by an engine speed sensor 30. These signals are converted into digital form in the I/O interface 22 to obtain acceleration data DA, selected position data DS, vehicle speed data DV, gear position data DG, rotation data DR, detection data DD and engine speed data DN. These data DA, DS, DV, DG DR, DD and DN are processed in accordance with control programs (which will be described later) stored in advance in the ROM 34 to produce the second driving signal GD, the clutch control signal SC and the target speed signal TN, which serve to shift the gear transmission 7 into the target gear position calculated in the gear-shifting control unit 13.

The second driving signal GD is applied to the gear-shifting actuator 11 for controlling the gear-shifting actuator 11 so as to shift the transmission 7 into the determined target gear position, while the clutch control signal SC is applied to the clutch control unit 10.

Explanation will be now given to the gear-shifting operation controlled by the gear-shifting control unit 13.

When a gear-shift operation is requested, the clutch 5 is disconnected in response to the clutch control signal SC. At the same time, the internal combustion engine 3 is maintained at its idling speed by having an engine control unit 31 control a throttle actuator 32 in accordance with the target speed signal TN. Under these circumstances, the gear-shifting actuator 11 operates in response to the second driving signal GD so as to shift the transmission 7 into the target gear position. After this, the automatic clutch device 6 operates in response to the clutch control signal SC to engage the clutch 5. At the same time, the target speed signal TN controls the internal combustion engine 3 to a rotational speed corresponding to the rotational speed of the counter shaft of the transmission 7, whereby the gear-shifting operation is performed automatically and smoothly.

Figure 2:
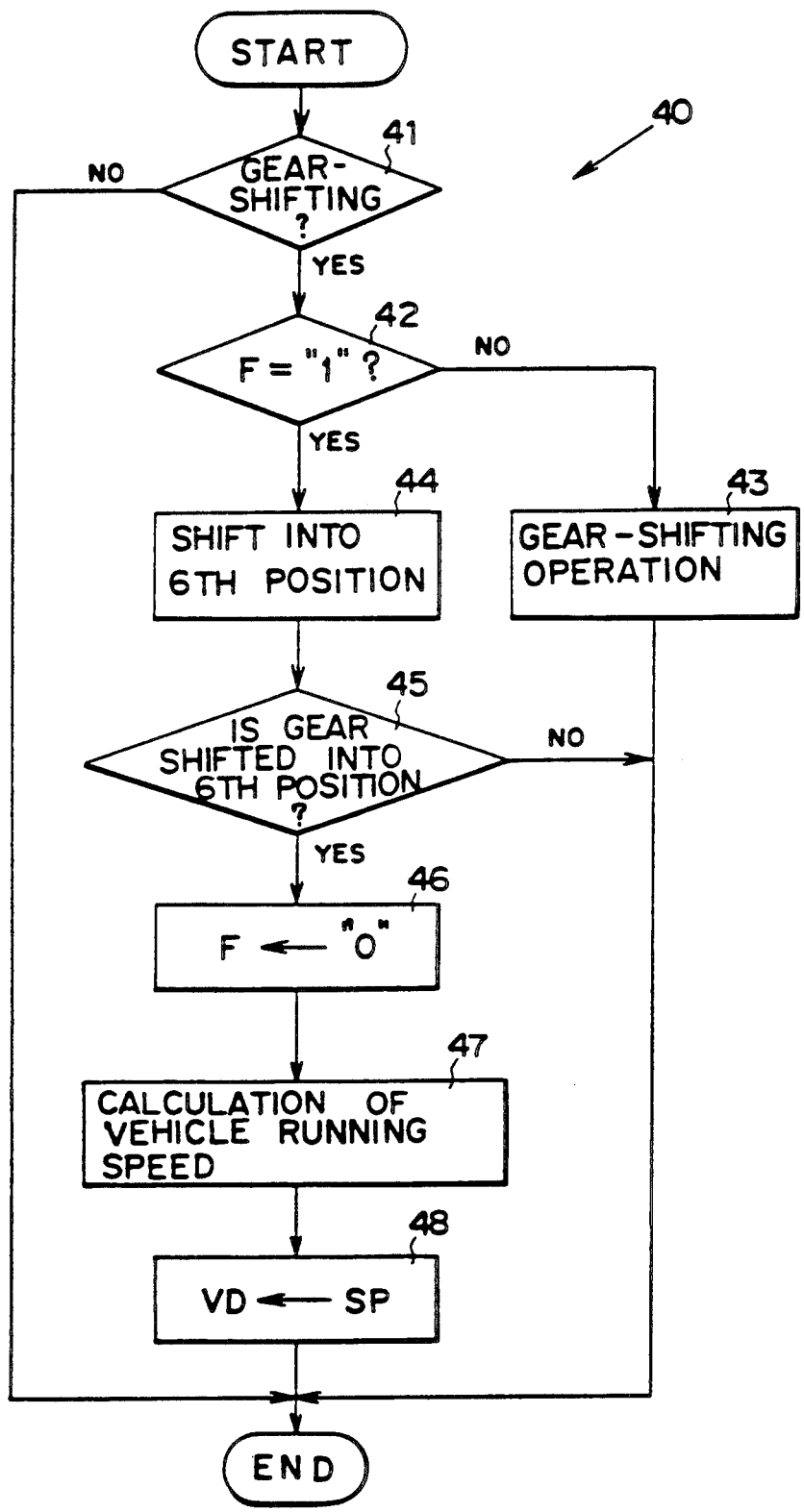
FIG. 2 is a flowchart showing a control program executed in the gear-shifting control unit of FIG. 1.
Figure 3:
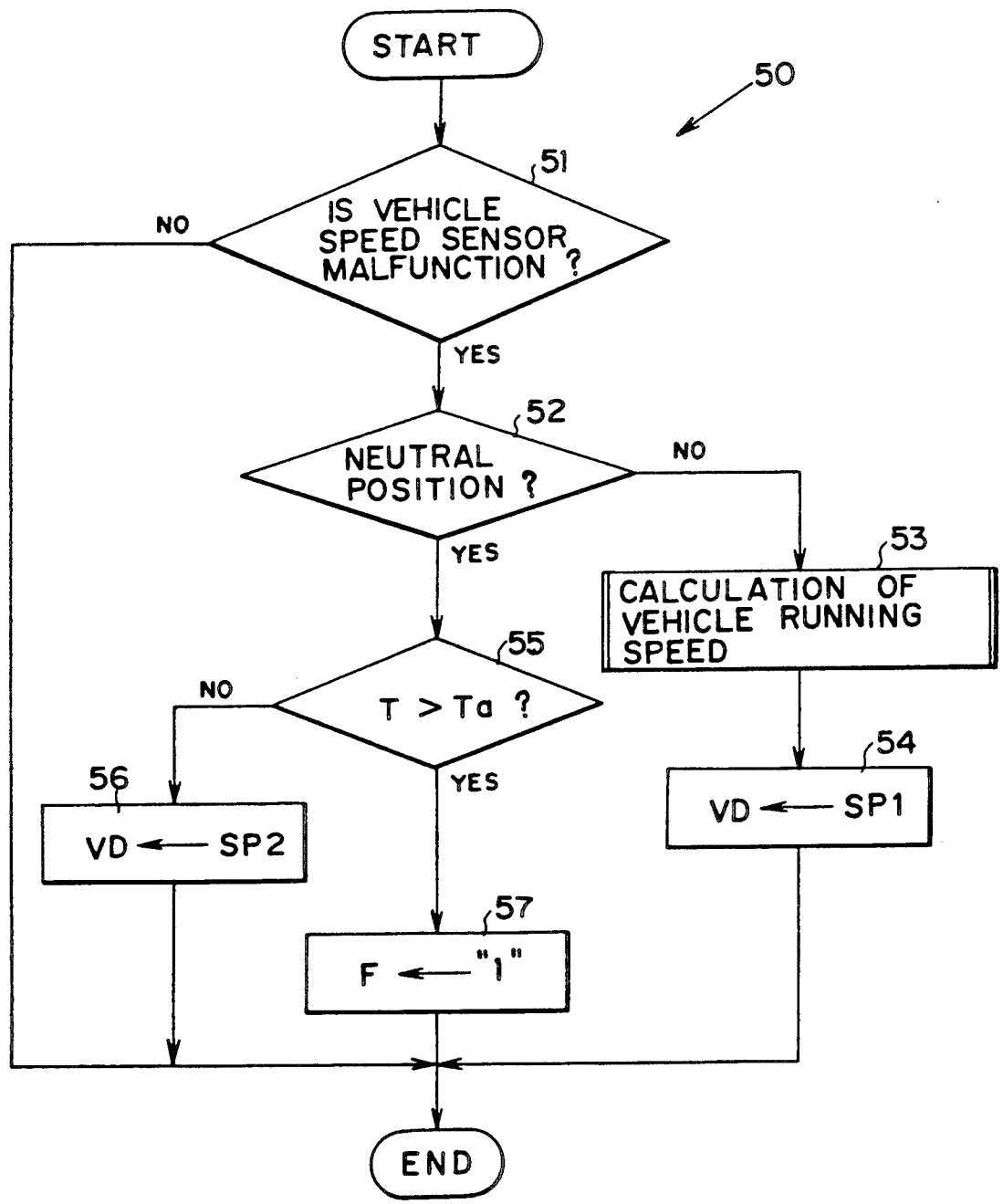
FIG. 3 is a flowchart showing a back-up processing program executed in the gear-shifting control unit of FIG. 1.

The gear-shifting operation described above is carried out by the execution of the programs shown in FIGS. 2 and 3.

The operation of the gear-shifting control unit 13 will be now described with reference to the flowcharts shown in FIGS. 2 and 3. Description is firstly given to the gear-shifting operation controlled by a gear-shifting control program 40 shown in FIG. 2.

The gear-shifting control program 40 is repeatedly activated at predetermined time intervals. The operation moves to step 41 wherein discrimination is made as to whether or not the gear-shifting operation should be carried out. This discrimination step includes an operation for determining the target gear position on the basis of the vehicle speed signal V and the like in a conventional manner, and the resulting determined target gear position is compared with the actual (current) gear position shown by the gear position signal PG. The determination in step 41 is NO when the current gear position is the same as the target gear position, and the execution of the program 40 is completed at this time.

The determination in step 41 is YES when the current gear position is not coincident with the target gear position, and the operation moves to step 42, wherein discrimination is made as to whether or not a flag F is set. The flag F is for indicating whether or not the vehicle transmission control system 1 is operated in the back-up control mode and the flag F is set when the back-up control is carried out in accordance with a back-up processing program 50 shown in FIG. 3. When the flag F is cleared, the operation moves to step 43, in which the target gear position is calculated on the basis of running speed data VD representing the vehicle running speed, which will be described later, and the control operation for shifting the transmission 7 into the target gear position based on the running speed data VD is carried out in a conventional manner. The execution of the program 40 is terminated at this time after the execution of step 43.

When the flag F is set, the determination in step 42 is YES and the operation moves to step 44, wherein a gear-shifting operation is carried out to shift the transmission 7 into the sixth speed position. Then, the operation moves to the following step 45, in which determination is made as to whether or not the transmission 7 has already shifted into its sixth speed position and when the determination is affirmative, the operation moves to step 46, in which the flag F is cleared. Then the operation moves to step 47, in which the vehicle running speed is calculated from the rotational speed of the counter shaft of the gear transmission 7 shown by the rotation signal RS and the fact that the transmission 7 is shifted into the sixth gear position, namely an input/output rotational speed ratio of the gear transmission 7 at this time, and the data SP showing the calculated vehicle speed is obtained. In the next step 48 the data SP is set as the running speed data VD and the execution of the program 40 at this time is completed. In addition, the determination in step 45 becomes NO when the gear-shifting operation into the sixth gear position has not yet been completed at the time of the execution of step 45, whereafter the execution of the program 40 is terminated at this time.

Description will be now given to the operation of the back-up processing in accordance with the back-up processing program 50 shown in FIG. 3.

The back-up processing program 50 is adapted to be executed at predetermined time intervals. After the activation of the program 50, the operation moves to step 51, where, in response to the detection signal DS, discrimination is made as to whether or not the vehicle speed sensor 17 has malfunctioned. The determination in step 51 is NO when the vehicle speed sensor 17 has not malfunctioned and the execution of the program 50 is terminated at this time.

When the determination in step 51 is YES, the operation moves to step 52, wherein discrimination is made on the basis of the gear position signal PG as to whether or not the transmission 7 is in its neutral position. The determination in step 52 becomes NO when the transmission 7 is in a position other than its neutral position, and the operation moves to step 53, in which the vehicle running speed is calculated from the gear position signal PG representing the current gear position and the rotation signal RS. In the following step 54 the data VD is replaced with data SP1 representing the calculated vehicle running speed obtained in step 53. The execution of the program 50 is completed at this time.

On the other hand, when the transmission 7 is in its neutral position, the determination in step 52 is YES and the operation moves to step 55, in which discrimination is made as to whether or not the period T of time lapsed from the time the transmission 7 was shifted into the neutral position exceeds a predetermined time period Ta. When T is not greater than Ta, the operation moves to step 56, in which the running speed data VD is replaced with data SP2 representing the vehicle running speed calculated in step 53 just before the transmission 7 was shifted into the neutral position. The execution of the program 50 is completed at this time.

When T exceeds Ta because the transmission 7 has been in the neutral position for a long time, the determination in step 55 becomes YES and the operation moves to step 57, wherein the flag F is set. The execution of the program 50 is completed at this time. For the condition where the flag F is set, as described with reference to FIG. 2, the transmission 7 is shifted into the sixth gear position when the command for gear-shifting of the transmission 7 is produced, and the actual vehicle running speed is calculated. Thus, in step 43 the transmission 7 is shifted into the target gear position determined by the use of this calculated actual vehicle running speed.

As will be understood from the foregoing description, when the transmission 7 is in a position other than the neutral position at the time the vehicle speed sensor 17 malfunctions, the vehicle running speed is calculated from the current gear position and the rotational speed on the input side of the gear transmission 7. The running speed data VD is replaced with the data SP1 representing the vehicle running speed obtained by the above described calculation and the back-up gear-shifting operation is carried out in step 43 by the use of the running speed data VD.

In the case where the vehicle speed sensor 17 malfunctions when the transmission 7 is in the neutral position, the running speed data VD is replaced with the calculated vehicle running speed SP2 obtained just before the transmission 7 was shifted into the neutral position and the gear-shifting operation is carried out so long as T is not greater than Ta. When T exceeds Ta in this case, since the flag F is set, the transmission 7 is once shifted into the sixth gear position for calculating the vehicle running speed at the time when the gear-shifting operation is requested, and the vehicle running data VD is replaced by the vehicle running speed SP obtained by this calculation.

Accordingly, even if the vehicle running speed increases because, for example, the vehicle is traveling down hill with the transmission 7 in the neutral position, it is always possible to detect the actual vehicle running speed at the time the gear-shifting operation is required. In this case, as the transmission 7 is shifted into the sixth gear position, a large load is prevented from being applied to the transmission 7 even if the vehicle running speed differs greatly from what it would normally be when the gear transmission 7 is in the sixth gear position, so that the vehicle running speed can be checked safely.

In the embodiment described above, the vehicle transmission control system 1 is adapted to shift the transmission 7 into the sixth gear position for detecting the vehicle running speed. However, the gear position to be shifted to for detecting the vehicle running speed is not limited to only the sixth gear position, but can be an appropriate high gear position other than the highest gear position, so long as no large load is caused to be applied to the transmission 7.

The arrangement described in the forgoing is useful for all control methods in which the target gear position is calculated from the gear position data and the engine speed or the rotational speed of the input side of the gear transmission without the aid of a vehicle speed sensor and the gear-shifting operation is carried out on the basis of the resulting target gear position. The method according to the present invention is therefore not limited in application solely to back-up gear-shifting control methods.

What is claimed is:

1. A method for controlling a gear-shift operation of a vehicle gear transmission installed between a wheel driving unit and an internal combustion engine in accordance with a vehicle running speed, said method comprising the steps of:

shifting the vehicle gear transmission into a prescribed high gear position in response to a command for shifting the gear transmission from a neutral position to a position other than the neutral position;

calculating the vehicle running speed from a rotational speed on an input side of the gear transmission while the gear transmission is in the prescribed high gear position;

determining a target gear position suitable for a current vehicle operation condition on the basis of the vehicle running speed obtained in said calculating step; and shifting the gear transmission to the target gear position.

2. A method as claimed in claim 1, wherein the prescribed high gear position is a highest gear position of the gear transmission.

3. A method as claimed in claim 1, wherein the prescribed high gear position is a gear position at which a large load is prevented from being applied to the gear transmission during running operation of the vehicle.

4. A method as claimed in claim 1, wherein the vehicle running speed is calculated in accordance with the rotational speed of the input side of the gear transmission and an input/output rotational speed ratio of the gear transmission at the prescribed high gear position.

5. A method for controlling a gear-shift operation of a vehicle gear transmission installed between a wheel driving unit and an internal combustion engine in accordance with vehicle running speed information calculated from gear position information and engine speed information without using an output of a vehicle speed sensor in the case where the vehicle speed sensor has malfunctioned, said method comprising the steps of:

obtaining speed data representing a vehicle running speed calculated just after the gear transmission was shifted into a neutral position;

discriminating whether or not a period of time lapsed from the time the gear transmission was shifted into the neutral position exceeds a predetermined time period;

shifting the vehicle gear transmission into a prescribed high gear position in response to a command for shifting the gear transmission from a neutral position to a position other than the neutral position in the case where said period of time is greater than the predetermined time period;

calculating estimated data representing a vehicle running speed at that time from a rotational speed on an input side of the gear transmission while the gear transmission is in the prescribed high gear position;

replacing the speed data with the estimated data;

determining a target gear position to which the gear transmission is to be shifted from the neutral position by the use of the speed data; and shifting the gear transmission to the target gear position.

6. A method as claimed in claim 5, wherein in said calculating step the vehicle running speed is calculated in accordance with the rotational speed of the input side of the gear transmission and an input/output rotational speed ratio of the gear transmission at the prescribed high gear position.

* * * * *